United States Patent
Yan et al.

(10) Patent No.: US 8,950,109 B2
(45) Date of Patent: Feb. 10, 2015

(54) APPLYING ACOUSTIC WAVE TO RICE SEED METHOD FOR INCREASING YIELD AND DEVICE THEREOF

(75) Inventors: Zhuosheng Yan, Guangdong (CN); Zhuoli Yan, Guangdong (CN); Jinxuan Yan, Guangdong (CN); Xiangru Tang, Guangdong (CN); Guoxi Li, Guangdong (CN); Zhizhong Yang, Guangdong (CN)

(73) Assignee: Guangzhou Newpower Ultrasonic Electronic, Guangdong (CN)

( * ) Notice: Subject to any disclaimer, the term of this patent is extended or adjusted under 35 U.S.C. 154(b) by 282 days.

(21) Appl. No.: 13/509,281

(22) PCT Filed: Aug. 4, 2010

(86) PCT No.: PCT/CN2010/001183
§ 371 (c)(1),
(2), (4) Date: May 10, 2012

(87) PCT Pub. No.: WO2011/079496
PCT Pub. Date: Jul. 7, 2011

(65) Prior Publication Data
US 2012/0222350 A1    Sep. 6, 2012

(30) Foreign Application Priority Data
Dec. 31, 2009    (CN) .......................... 2009 1 0214414

(51) Int. Cl.
| | |
|---|---|
| A01G 29/00 | (2006.01) |
| A01G 7/04 | (2006.01) |
| A01C 1/00 | (2006.01) |
| A01G 16/00 | (2006.01) |

(52) U.S. Cl.
CPC ... A01G 7/04 (2013.01); A01C 1/00 (2013.01); A01G 16/00 (2013.01)
USPC .................................................. 47/58.1 LS

(58) Field of Classification Search
CPC .......... A01G 16/00; A01G 9/00; A01G 7/04; A01C 1/00; A01C 1/08; A01C 1/06; A01C 1/02; A01C 2001/048; A01N 25/00; A61N 2005/1024
USPC ......... 47/58.1 LS, 1.3, 57.6, 58.1 R, 58.1 SE, 47/58.1 FV; 422/128; 800/295
See application file for complete search history.

(56) References Cited

U.S. PATENT DOCUMENTS

| | | | | |
|---|---|---|---|---|
| 3,499,436 | A * | 3/1970 | Balamuth | 601/2 |
| 4,055,915 | A * | 11/1977 | Charnoe | 47/58.1 R |
| 5,498,431 | A * | 3/1996 | Lindner | 426/238 |
| 6,453,609 | B1 * | 9/2002 | Soll et al. | 47/57.6 |
| 8,835,142 | B2 * | 9/2014 | Medoff | 435/171 |
| 2009/0286295 | A1 * | 11/2009 | Medoff et al. | 435/162 |

* cited by examiner

*Primary Examiner* — Monica Williams
*Assistant Examiner* — Joshua Huson

(57) ABSTRACT

A method of applying acoustic wave to rice seeds for increasing yield comprises the following steps: (1) Process rice seeds by winnowing and/or wet separation; (2) Soak the rice seeds for 10 to 12 hours and pre-process by acoustic wave irradiation in power density from 0.25 to 25 w/L; (3) Use acoustic wave frequency from 10 khz to 2000 khz for acoustic wave processing; (4) Take out the rice seeds processed by the acoustic wave from soaking liquid and keep the rice seeds stationary until they excrete convex white flakes. A device for applying acoustic wave to rice seeds for increasing yield comprises a container (1) for holding rice seeds and soaking liquid, and also a dasher (2); at least one ultrasonic transducer (3) for generating acoustic wave is disposed on sides or bottom of the container.

8 Claims, 5 Drawing Sheets

APPLYING ACOUSTIC WAVE TO RICE SEED METHOD FOR INCREASING YIELD AND DEVICE THEREOF

BACKGROUND OF THE INVENTION

The present invention relates generally to the technical field of processing rice seeds, and specifically relates to a method of applying acoustic wave to rice seeds for increasing yield and a device thereof.

Rice is one of the three major food crops in the world. Its planting area occupies ⅕ of the total planting area of food crops. The yield of rice amounts to about 480 million tons a year, which is ¼ of all food crops yielded in the world. Rice is also the major food for more than half of the world's population. Rice is one of the major food crops planted in China and it yields ½ of the total yield of food crops in China. Therefore, improving rice production technology is significantly important to enhancing food security in China and in the whole world. Ultrasonic wave being an important environmental stress has been applied to a certain extent for increasing the yield of horticultural crops and breeding efficiency of crops etc. An article named "Introduction to ultrasonic wave applications", published at issue 7 of year 2006 in "Popular Science & Technology" magazine by Ren Xingan (1993) and Yang Bo (Department of Electrical Engineering of Shaanxi University of Technology, at Shaanxi Hanzhong 723003, China), has discussed the effect of ultrasound on the growth and yield enhancement of rice. The effect of ultrasonic wave on the growth and yield of rice has also been discussed. Previous researches reveal that ultrasonic wave has a certain level of effectiveness on increasing the yield of rice. However, the effect is not stable. There is an increase of yield under one kind of ultrasonic processing but a decrease under another kind of ultrasonic processing. It is because the effect of ultrasonic wave on processing seeds is closely related to technology of pre-processing rice seeds and design of ultrasonic wave parameters. Mistakes in any part will lead to a totally reversed mechanism. At present, there is no report or published patent about a processing method of rice seeds by ultrasonic wave, and it is the important reason why ultrasonic wave technology is still not extensively applied to rice plantation nowadays. Besides, previous researches mostly recite the use of industrial ultrasonic wave cleaner for processing rice seeds, and there is no ultrasonic rice seed processor specifically designed in accordance with the characteristics of rice seeds.

BRIEF SUMMARY OF THE INVENTION

In view of the aforesaid disadvantages now present in the prior art, the present invention provides a method of applying acoustic wave to rice seeds for increasing yield such that rice plantation would have significant increase in yield.

Another object of the present invention is to provide a device for applying acoustic wave to rice seeds for increasing yield.

The above objects are attained by the present invention as follows:

A method of applying acoustic wave to rice seeds for increasing yield comprises the following steps:

1. Process rice seeds by winnowing and/or wet separation to remove undergrown and imperfect seeds and also impurities;

2. Soak the rice seeds for 10 to 12 hours in clean water or in a soaking liquid prepared as nutrition activation liquid added with anti-pest and anti-bacterial solution. Soaking can be done in normal temperature, and preferably done in the soaking liquid with a temperature from 25 to 37 degree celsius. A weak irradiation of acoustic wave in power density from 0.25 to 250 w/L could be applied during the soaking for pre-processing and applied in general by indirect pulse action. Total time of the acoustic wave pre-processing does not exceed 45 minutes, preferably 1 to 45 minutes, and accompanied by moderately slow motion of mixing so that the rice seeds suspend evenly in the soaking liquid during all time through the soaking without interfering with the acoustic wave. A preferable range of the said power density could be from 0.25 to 25 w/L.

3. Use acoustic wave frequency from 10 khz to 2000 khz for acoustic wave processing in power density from 0.25 to 800 w/L. Total time of the acoustic wave processing ranges from 2 to 60 minutes accompanied by moderately slow motion of mixing so as not to interfere with the acoustic wave. During all time of the processing, including the soaking, the rice seeds suspend slowly and evenly in water or in diluted nutrition activation liquid so that all the rice seeds receive irradiation of acoustic wave evenly.

4. Take out the rice seeds processed by the acoustic wave from the soaking liquid and keep them stationary until the rice seeds excrete convex white flakes. The rice seeds taken out could be placed on a non-sealed container being a basket rack weaved from wood or bamboo materials whereas inner layer of the basket rack should be covered with 1 to 2 layers of cotton and linen cloth, and the rice seeds should be covered with 1 to 2 layers of cotton and linen cloth. Thickness of the rice seeds ranges from 2 to 8 cm. The basket rack is then placed indoor under good ventilation. Water is sprayed occasionally to keep moisture of the rice seeds. After 3 to 5 days under the above processing, plant the seeds when their radicles are as long as a rice seed and their germs are as long as half of a rice seed.

Frequencies of the acoustic wave arranged in array in a container provided for the acoustic wave could be exactly the same or different during actual use. A method of activating irradiation of the acoustic wave could be in continual or pulse form.

A device for applying acoustic wave to rice seeds for increasing yield comprises a container for holding soaking liquid, and also a dasher. At least one ultrasonic transducer is disposed at sides and/or bottom of the container.

The ultrasonic transducer(s) is/are arranged in array at the sides of the container or the bottom of the container.

A device for applying acoustic wave to rice seeds for increasing yield comprises a container for soaking seeds, a dasher, an ultrasonic function trough and a rice seeds receiver. The dasher is provided in the container. Ultrasonic transducers are disposed at sides of the container. An end of the ultrasonic function trough is provided with a soaking liquid receiver. The container is disposed just above the soaking liquid receiver. Another end of the ultrasonic function trough is connected with the rice seeds receiver. A conveyor and at least one ultrasonic vibration panel are provided in the ultrasonic function trough. The ultrasonic vibration panel(s) is/are connected to ultrasound wave emitter(s) via connection wire(s).

There are more than two ultrasonic vibration panels arranged in array in the ultrasonic function trough.

The present invention has the following advantages compared with the prior arts: (1) By using the above acoustic wave processing, yield of rice could be significantly increased. Ultrasonic wave processing in frequency of 40 kHz could increase yield of Peizataifeng (a rice breed) by 9.43%, and processing in frequency of 20 kHz could increase yield of Guixiangzhan (a rice breed) by 10.55% relative to a control. A major reason for yield increase is that acoustic wave processing increases number of productive panicles and per unit area of spikelets' number of rice; (2) Acoustic wave processing significantly reduces chalky rice rate and chalkiness of rice; (3) Acoustic wave processing significantly enhances gel consistency of rice; (4) The above device for applying acoustic wave to rice seeds facilitates existing plantation and production and increases production efficiency.

DETAILED DESCRIPTION OF THE INVENTION

Figure 1:
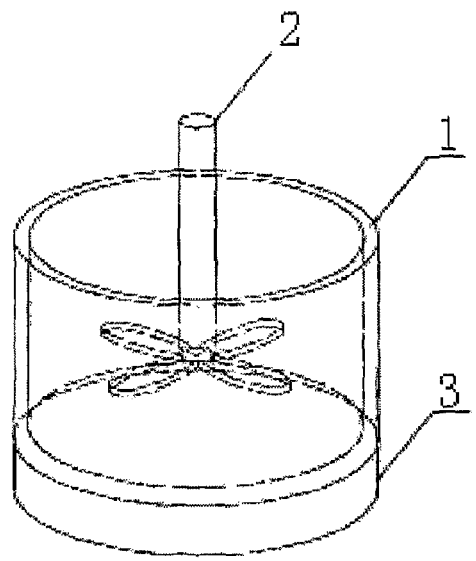
FIG. 1 is a structural illustration of a first embodiment of a device for applying acoustic wave to rice seeds for increasing yield.

The present invention is further described below with reference to specific embodiments.

A method of applying acoustic wave to rice seeds for increasing yield comprises the following steps:

1. Process rice seeds by winnowing and/or wet separation to remove undergrown and imperfect seeds and also impurities;

2. Soak the rice seeds for 10 to 12 hours in clean water or in a soaking liquid prepared as nutrition activation liquid added with anti-pest and anti-bacterial solution for killing pests and bacteria hidden between the rice seeds. Soaking can be done in normal temperature, and preferably done in the soaking liquid with a temperature from 25 to 37 degree celsius. A weak irradiation of acoustic wave in power density from 0.25 to 250 w/L could be applied during the soaking for pre-processing and applied in general by indirect pulse action. Total time of acoustic wave pre-processing does not exceed 45 minutes, preferably 1 to 45 minutes, and accompanied by moderately slow motion of mixing so that the rice seeds suspend evenly in the soaking liquid during all time through the soaking without interfering with the acoustic wave. A preferable range of the said power density could be from 0.25 to 25 w/L for the above process of soaking rice seeds.

3. Use acoustic wave frequency from 10 khz to 2000 khz for acoustic wave processing in power density possibly from 0.25 to 800 w/L. Total time of acoustic wave processing ranges from 2 to 60 minutes and accompanied by moderately slow motion of mixing so as not to interfere with the acoustic wave. During all time of the processing, including the soaking, the rice seeds suspend slowly and evenly in water or in diluted nutrition activation liquid so that all the rice seeds receive irradiation of acoustic wave evenly. The acoustic wave frequency is preferred to be ultrasonic wave ranging from 18 khz to 60 khz because this range has more significant effect on yield increase. A preferred ultrasonic wave frequency ranges from 20 to 40 kHz because this range produces the best processing effect. Besides, power density of the acoustic wave could range from 0.1 to 3 w/cm$^2$, and preferably from 0.25 to 80 w/L. A preferred acoustic wave processing time ranges from 20 to 60 minutes.

4. Take out the rice seeds processed by the acoustic wave from the soaking liquid and keep them stationary until the rice seeds excrete convex white flakes. The rice seeds taken out could be placed on a non-sealed container being a basket rack weaved from wood or bamboo materials whereas inner layer of the basket rack should be covered with 1 to 2 layers of cotton and linen cloth, and the rice seeds should be covered with 1 to 2 layers of cotton and linen cloth. Thickness of the rice seeds ranges from 2 to 8 cm. The basket rack is then placed indoor under good ventilation. Water is sprayed occasionally to keep moisture of the rice seeds. After 3 to 5 days under the above processing, plant the seeds when their radicles are as long as a rice seed and their germs are as long as half of a rice seed.

Frequencies of the acoustic wave could be exactly the same or different during actual use. A method of activating irradiation of the acoustic wave could be in continual or pulse form. These variations depend on factors such as the breed of the rice seeds.

Figure 2:
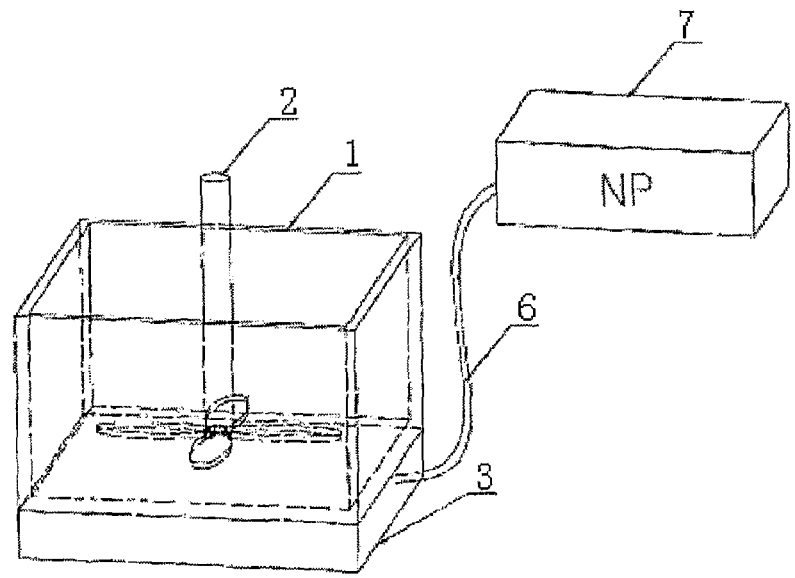
FIG. 2 is a structural illustration of the first embodiment of a device for applying acoustic wave to rice seeds for increasing yield.

A device for applying acoustic wave to rice seeds for increasing yield as shown in FIGS. 1 to 2 comprises mainly a container 1 for holding rice seeds and soaking liquid, and also a dasher 2. At least one ultrasonic transducer 3 for generating acoustic wave is disposed on sides or bottom of the container. The ultrasonic transducer(s) 3 is/are connected with an ultrasound wave emitter 7 via a connection wire 6. The dasher 2 could be an independent mixer or a mixer integrally connected with the container 1. The container 1 is generally in the most basic shape as a cube or a cuboid. The container 1 is generally provided with the ultrasonic transducer(s) at an outer wall on its bottom, with a direction of ultrasound irradiation from bottom to top vertically pointing to a cavity of the container. In actual use, put the rice seeds into the container, add soaking liquid of 2 to 5 times the mass of the rice seeds, and then activate the ultrasound wave emitter. Ultrasound wave is irradiated into the cavity of the container 1 and impacts the rice seeds in the soaking liquid.

Figure 3:
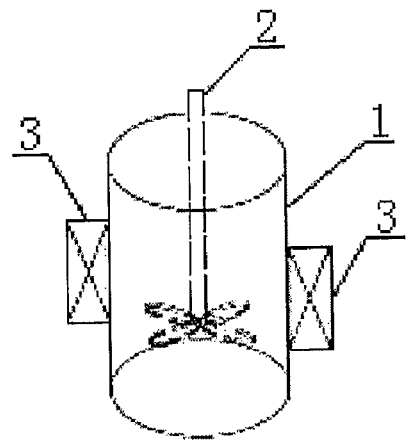
FIG. 3 is a structural illustration of a second embodiment of a device for applying acoustic wave to rice seeds for increasing yield.
Figure 4:
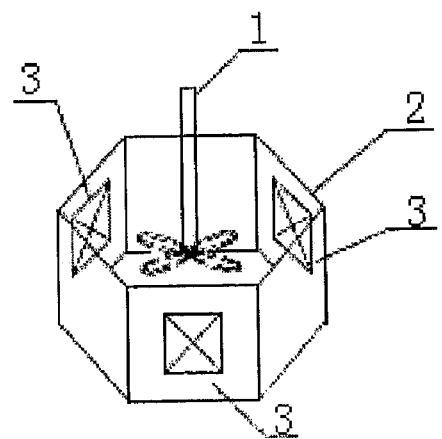
FIG. 4 is a structural illustration of a third embodiment of a device for applying acoustic wave to rice seeds for increasing yield.

The ultrasonic transducers 3 are formed in array on different sides and/or bottom of the container 1. The container 1 for holding rice seeds and soaking liquid has a configuration and structure not limited to fixed shapes. As shown in FIG. 3, the container 1 could adopt a cylinder form, and the ultrasonic transducers 3 are arranged in array on outer sidewalls of the cylinder. As shown in FIG. 4, the container 1 could also adopt a polygonal form, and the ultrasonic transducers 3 are arranged in array at sidewalls of the container. Ultrasound wave could irradiate into the cavity of the container at different positions and angles from different sides or bottom of the container.

Figure 5:
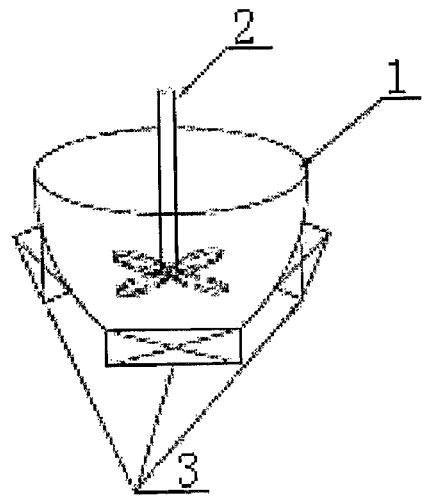
FIG. 5 is a structural illustration of a fourth embodiment of a device for applying acoustic wave to rice seeds for increasing yield.
Figure 6:
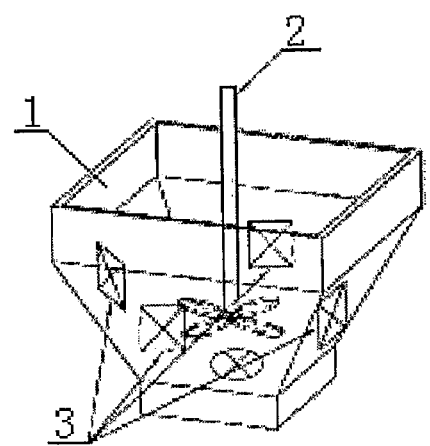
FIG. 6 is a structural illustration of a fifth embodiment of a device for applying acoustic wave to rice seeds for increasing yield.
Figure 7:
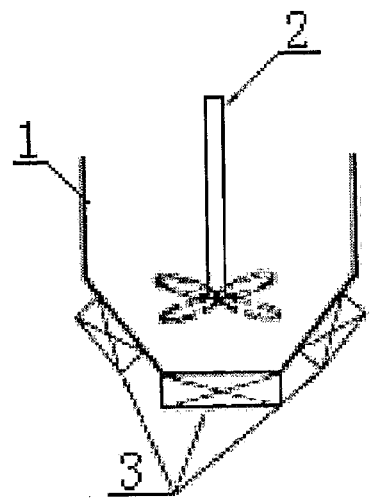
FIG. 7 is a structural illustration of the fifth embodiment of a device for applying acoustic wave to rice seeds for increasing yield.

As shown in FIG. 5, the container 1 could also adopt a hemispherical bowl form, and the ultrasonic transducers 3 are arranged in array at bottom of sidewalls of the container. As shown in FIGS. 6-7, the container 1 could also adopt a pyramidal focal form, and the ultrasonic transducers 3 are arranged in array at bottom of sidewalls of the container. Ultrasound wave energy could focus around the dasher 2 to achieve better processing effect.

Figure 8:
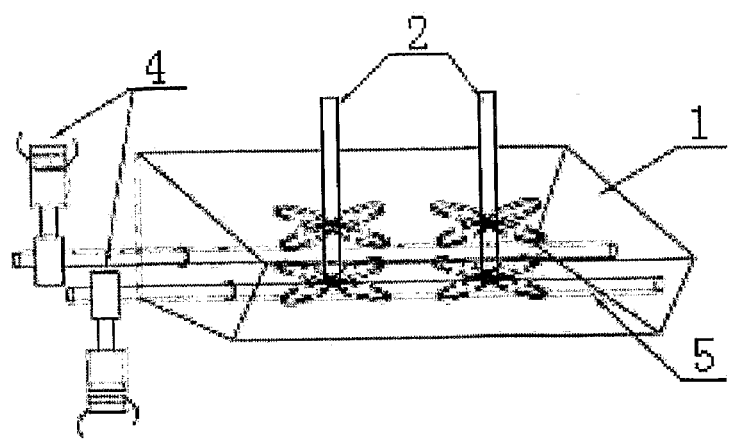
FIG. 8 is a structural illustration of a sixth embodiment of a device for applying acoustic wave to rice seeds for increasing yield.

As shown in FIG. 8, ultrasound rods 5 are disposed in the container 1. An end of each ultrasound rod 5 is connected with a clamping type ultrasonic transducer 4. Having the ultrasound rods as axes, irradiation is made evenly around the vast soaking liquid to optimize processing effect. Dashers 2 are also disposed in the container 1.

Figure 9:
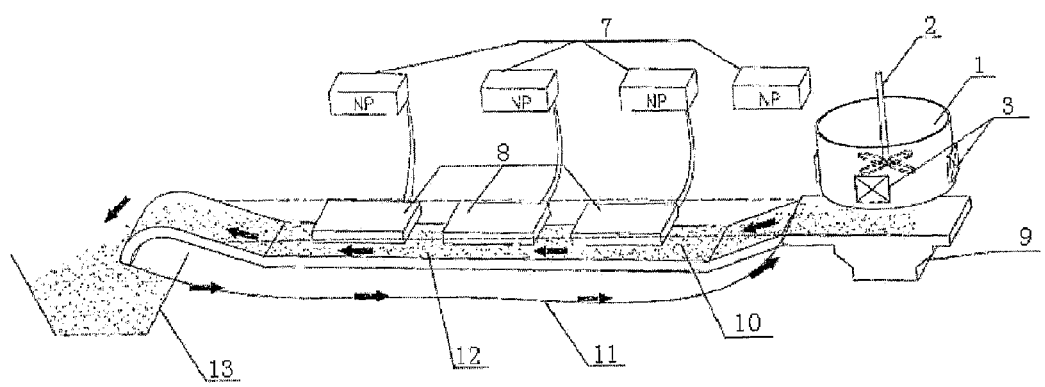
FIG. 9 is a structural illustration of a seventh embodiment of a device for applying acoustic wave to rice seeds for increasing yield.

A device for applying acoustic wave to rice seeds for increasing yield as shown in FIG. 9 comprises a container 1 for soaking seeds, a dasher 2, an ultrasonic function trough 12, and a rice seeds receiver 13, wherein the dasher 2 is disposed in the container 1, and ultrasonic transducers 3 are provided at sides of the container. An end of the ultrasonic function trough 12 is provided with a soaking liquid receiver 9 while the container 1 is disposed just above the soaking liquid receiver 9; and another end of the ultrasonic function trough 12 is connected with the rice seeds receiver 13. A conveyor 11 and at least one ultrasonic vibration panel 8 are provided in the ultrasonic function trough 12. The ultrasonic vibration panel(s) 8 is/are connected to ultrasound wave emitter(s) 7 via connection wire(s). There are multiple ultrasonic vibration panels 8 arranged in array in the ultrasonic function trough 12.

Rice seeds are soaked in the container 1. With the help of the dasher 2, the rice seeds are irradiated by pulse type ultrasonic wave. Next, discharge the rice seeds together with soaking liquid into the soaking liquid receiver 9. The rice seeds and the soaking liquid flow from the soaking liquid receiver 9 to the conveyor 11, transported into the ultrasonic function trough 12 for continual irradiation by ultrasonic wave along their way to the rice seeds receiver 13 where collected and processed rice seeds are further processed by subsequent germination. Soaking liquid tubes are disposed in the ultrasonic function trough 12 for draining soaking liquid in and out of the ultrasonic function trough 12. Accordingly, rice seeds can be processed continuously, thereby enhancing production efficiency.

By using the method of the present invention, acoustic wave processing of rice seeds could be continued up till a growing stage of the rice seeds in large paddy fields, resulting in significant increase in number of productive panicles, productive spikelets, and also yield of rice. Similar effects appear in other common crops such as wheat etc. The possible reason is that acoustic wave processing causes increase in activities of enzyme in rice's germs and even induces changes in genetic substances of the rice's germs. In short, acoustic wave processing could significantly increase yield of rice. Ultrasonic wave processing in frequency of 40 kHz could increase yield of Peizataifeng by 9.43%, and processing in frequency of 20 kHz could increase yield of Guixiangzhan by 10.55% relative to a control. A major reason for yield increase is that acoustic wave processing increases number of productive panicles and per unit area of spikelets' number of rice. Also, chalky rice rate and chalkiness of rice are significantly reduced. Tests reveal that chalkiness of Peizataifeng is significantly reduced after acoustic wave processing. Besides, gel consistency of Guixiangzhan is also significantly enhanced by acoustic wave processing.

Effect Analysis:

1. Effects of acoustic wave on yield of rice and yield constituting factors are reflected in the following table:

|  | Processing | Number of productive panicles ($\times 10^4$/666.7 $m^2$) | Number of spikelets per unit area ($\times 10^4$/666.7 $m^2$) | Seed setting rate (%) | Total weight of $10^3$ grains (g) | Yield in actual measurement ($m^2$) |
|---|---|---|---|---|---|---|
| Peizataifeng | CK | 17.2a | 3590.4a | 61.0a | 23.1a | 535a |
|  | 20 kHz | 18.1a | 3511.4a | 63.5a | 23.3a | 555ab |
|  | 40 kHz | 18.7b | 3971.3b | 66.4a | 23.0a | 582b |
| Guixiangzhan | CK | 17.3a | 1920.3a | 78.2a | 26.6a | 398a |
|  | 20 kHz | 18.5b | 2264.5b | 83.3a | 26.2a | 440b |
|  | 40 kHz | 18.1ab | 2427.2b | 76.8a | 26.4a | 412a |

Acoustic wave processing could significantly increase the yield of rice, wherein processing of Peizataifeng under frequency of 40 kHz gives a yield significantly different from a control by an average increase of 9.43% when compared to the control. Processing of Guixiangzhan under frequency of 20 kHz gives a yield increase by 10.55% when compared to a control, and such difference is also significant. In respect of yield constituting factors, processing of Peizataifeng under frequency of 40 kHz results in significant increase in the number of productive panicles by 8.72% and the number of spikelets per unit area by 10.61% when compared to the control. Processing of Guixiangzhan under frequency of 20 kHz also results in significant increase in the number of productive panicles per unit area when compared to the control. Ultrasonic wave processing of Guixiangzhan under both frequencies both results in significant increase in the number of spikelets per unit area when compared to the control.

2. Effects of acoustic wave on rice quality are reflected in the following table:

|  | Processing | Coarse rice rate (%) | Milled rice rate (%) | Head rice rate (%) | Chalky rice rate (%) | Chalkiness (%) | Gel consistency (mm) | Amylose content (%) |
|---|---|---|---|---|---|---|---|---|
| Peizataifeng | CK | 77.7a | 69.2a | 62.8a | 29.8a | 10.3a | 67.5a | 22.9a |
|  | 20 kHz | 77.2a | 68.9a | 62.9a | 29.7a | 6.5b | 65.7a | 22.7a |
|  | 40 kHz | 77.8a | 69.3a | 61.9a | 29.3a | 7.8b | 64.3a | 22.4a |
| Guixiangzhan | CK | 77.8a | 66.1a | 51.4a | 22.3a | 4.0a | 77.8b | 16.3a |
|  | 20 kHz | 77.8a | 67.0a | 51.2a | 15.8b | 2.5b | 84.7a | 16.5a |
|  | 40 kHz | 77.8a | 66.1a | 51.4a | 17.3b | 2.7b | 81.1a | 16.8a |

In respect of milling quality of rice, acoustic wave processing does not significantly affect the coarse rice rate, the milled rice rate and the head rice rate of both rice breeds. In respect of analysis according to appearance quality, acoustic wave processing under both frequencies both results in significant decrease in the chalkiness of Peizataifeng by 58.4% (20 kHz) on average and 32.1% (40 kHz) on average respectively when compared to the control. Also, acoustic wave processing decreases the chalky rice rate and the chalkiness of Guixiangzhan, wherein the chalky rice rate is decreased by 41.1% (20 kHz) and 28.9% (40 kHz) respectively when compared to the control and the chalkiness is decreased by 60.0% (20 kHz)

and 48.1% (40 kHz) respectively when compared to the control. In respect of analysis according to cooking quality, acoustic wave processing significantly increases the gel consistency of Guixiangzhan.

As shown above, acoustic wave processing of rice seeds and specifically the acoustic wave processing itself could result in significant increase in the number of productive panicles, the number of spikelets and also the yield of rice, and could also significantly decrease the chalky rice rate and the chalkiness of rice so that the appearance quality of rice is significantly improved. Accordingly, acoustic wave processing could be a simple and economical way to improve hybrid rice quality. Observations similar to the above could also be seen in other crops such as wheats etc.

What is claimed is:

1. A device for applying acoustic wave to rice seeds for increasing yield comprising a container for soaking seeds, a dasher, an ultrasonic function trough and a rice seeds receiver wherein the dasher is provided in the container and ultrasonic transducers are disposed at sides of the container, characterized in that, an end of the ultrasonic function trough is provided with a soaking liquid receiver; the container is disposed just above the soaking liquid receiver; another end of the ultrasonic function trough is connected with the rice seeds receiver; a conveyor and at least one ultrasonic vibration panel are provided in the ultrasonic function trough; and the ultrasonic vibration panel is connected to an ultrasound wave emitter via a connection wire.

2. The device for applying acoustic wave to rice seeds for increasing yield as in claim 1, characterized in that; soaking liquid tubes are disposed in the ultrasonic function trough.

3. A method of applying acoustic wave to rice seeds for increasing yield using a device as claimed in claim 1, characterized in that, the method comprises the following steps:

(1) Process rice seeds by winnowing and/or wet separation to remove undergrown and imperfect seeds and also impurities;
(2) Soak the rice seeds in a soaking liquid for 10 to 12 hours, and apply acoustic wave irradiation for pre-processing during soaking;
(3) Use acoustic wave frequency from 10 khz to 2000 khz for acoustic wave processing;
(4) Take out the rice seeds processed by the acoustic wave from soaking liquid and keep the rice seeds stationary until they excrete convex white flakes.

4. The method of applying acoustic wave to rice seeds for increasing yield as in claim 3, characterized in that, the acoustic wave applied in said step (2) is in indirect pulse form, applied for 1 to 45 minutes, and accompanied by mixing so that the rice seeds suspend evenly in the soaking liquid.

5. The method of applying acoustic wave to rice seeds for increasing yield as in claim 3, characterized in that, the soaking liquid is clean water or prepared nutrition activation liquid, and the soaking is done in the soaking liquid with a temperature from 25 to 37 degree celsius.

6. The method of applying acoustic wave to rice seeds for increasing yield as in claim 3, characterized in that, acoustic wave frequency from 18 khz to 60 khz is used for the acoustic wave processing in said step (3).

7. The method of applying acoustic wave to rice seeds for increasing yield as in claim 3, characterized in that, power density of the acoustic wave in said step (3) ranges from 0.25 to 800 w/L.

8. The method of applying acoustic wave to rice seeds for increasing yield as in claim 3, characterized in that, total time of the acoustic wave processing ranges from 2 to 60 minutes and accompanied by mixing so that the rice seeds suspend evenly in the soaking liquid.

* * * * *